Figure 1:
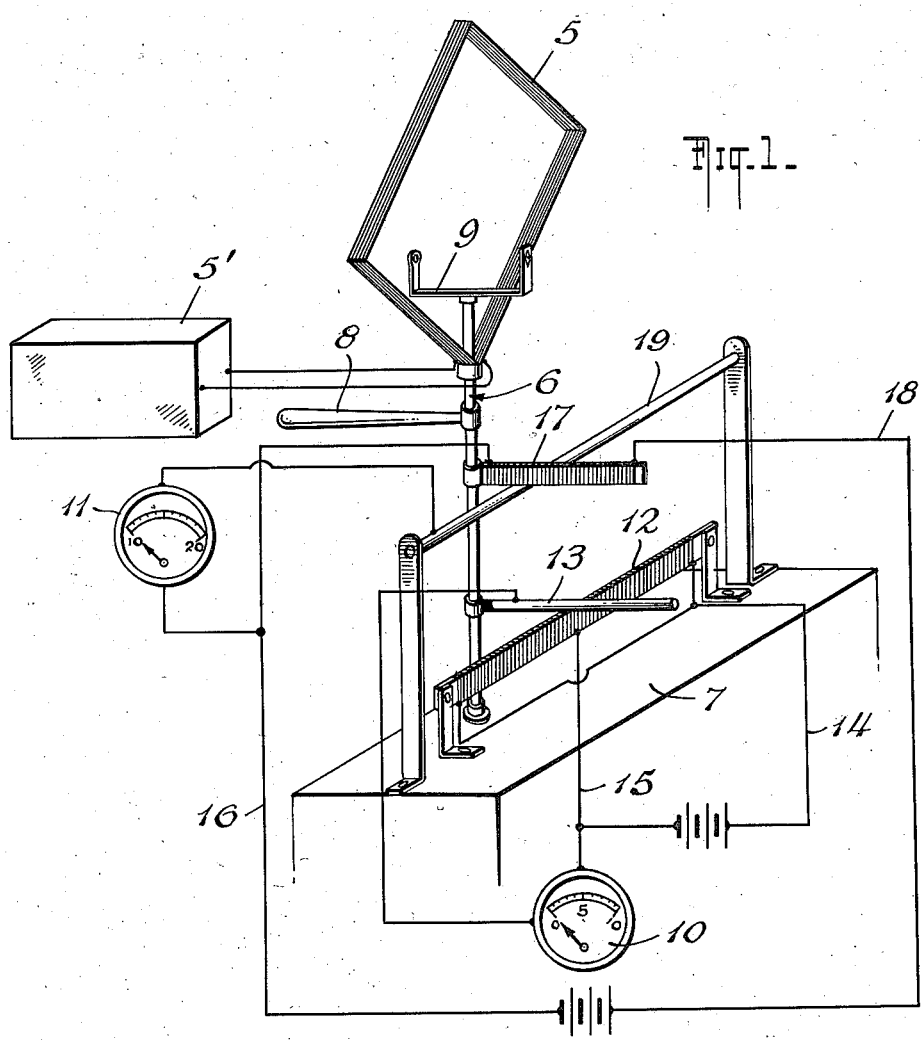

April 30, 1935.　　　　F. EICKE　　　　1,999,232
DISTANCE FINDING SYSTEM
Filed Dec. 26, 1931　　　　2 Sheets-Sheet 1

INVENTOR.
FERDINAND EICKE
BY
　　ATTORNEYS.

April 30, 1935.  F. EICKE  1,999,232
DISTANCE FINDING SYSTEM
Filed Dec. 26, 1931  2 Sheets-Sheet 2
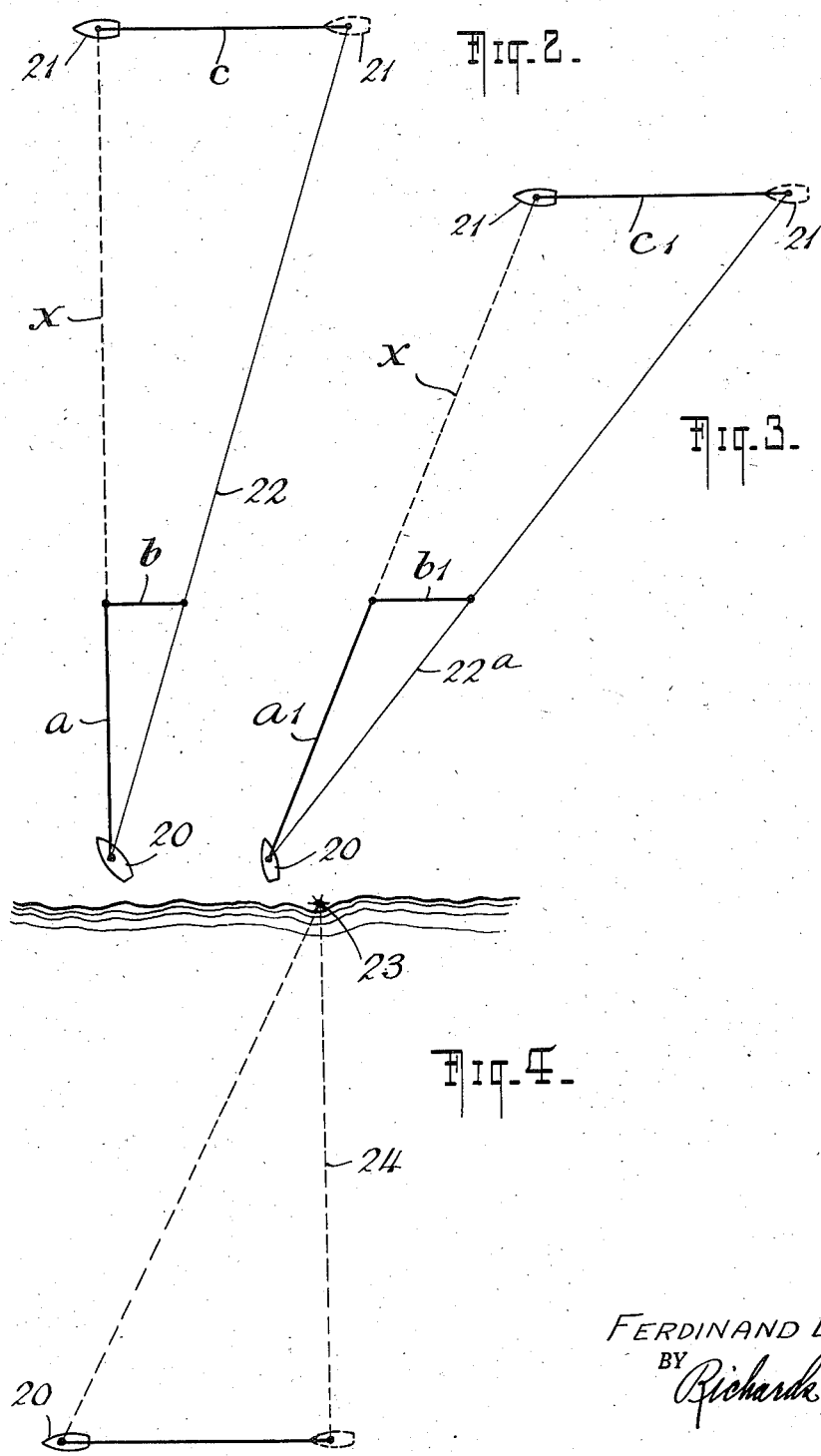
INVENTOR.
FERDINAND EICKE
BY
ATTORNEYS.

Patented Apr. 30, 1935

1,999,232

UNITED STATES PATENT OFFICE 1,999,232

DISTANCE FINDING SYSTEM

Ferdinand Eicke, Bronx, N. Y., assignor to Ship Control Corporation, New York, N. Y., a corporation of New York Application December 26, 1931, Serial No. 583,270

7 Claims. (Cl. 250—11)

This invention relates to improvements in apparatus employed in the art of navigation and has reference to a method and means of determining distances between two points, at least one of which is moving relative to the other.

The invention, which is particularly useful on ships navigating at sea, makes use of signals, such as radio signals, transmitted from a distant sending point, such as a land station or ship, to determine the distance thereof from the point of reception of the signals. As distinguished from known systems, wherein it is necessary in every instance to establish communication between a ship and a land station in order to procure data for the purpose of ascertaining the position of the ship, it is possible, with the present system, to quickly calculate the approximate distance between a ship and a land station, or between two ships, without resorting to interchange of communications, and to more accurately determine such distance between ships by obtaining information from the distant ship as to its course and speed of travel. In either event, the present system makes possible, through the employment of a direction finder such as a rotatable antenna and an indicating mechanism controlled thereby, the ascertainment of a certain factor or factors by means of which the distance between two points may be approximated in a simple and rapid manner by triangulation.

The inventive idea involved is capable of receiving a variety of expressions, one of which, for purposes of illustration, is shown in the accompanying drawings, wherein:

Figure 1 is a perspective view, partially in diagram, of an apparatus and circuits employed in connection with the invention; and Figures 2 to 4 are diagrammatic views illustrating the method of calculating a position by triangulation.

The apparatus, which is especially useful in foggy weather and by means of which certain factors are determined in order to calculate the distance between different points, will first be described. In its preferred form, the apparatus is constructed to receive radio signals, such as those which are now commonly used for identifying land stations and ships. To this end, there is provided a direction-finding mechanism in the form of loop antenna 5 mounted upon a rotatable shaft 6 which is supported upon a suitable base 7. Said antenna is to be coupled with a radio receiving circuit 5' of any known design by means of which the received signals will be made audible and when the antenna is rotated, as for instance by the handle 8, the intensity of a received signal will vary until the antenna is in a position wherein its plane is at right angles to the direction of the transmitting source of said signal, at which time the signal will no longer be heard and the direction of said source is thereupon determined. The upper end of the shaft 6 carries an instrument, conventionally shown at 9, utilized to sight visible objects for a purpose which will appear in the course of the description.

The rotation of the antenna is employed to control the operation of indicating devices, such as the calibrated meters 10 and 11, by means of which certain factors, used in calculating distances in the manner later to appear, are definitely ascertained. In order to accomplish the control of the meter 10, an electric circuit is provided in which is included a fixed resistance 12 mounted upon the base 7 and a movable contact arm 13 carried by the shaft 6. One end of said resistance is connected to one pole of battery through the conductor 14, while the other pole of said battery is joined to the center of said resistance by the conductor 15. The meter 10 is bridged across this circuit by connecting one terminal thereof direct to battery and the other terminal to the movable contact arm 13 so that, when the latter is at right angles to the resistance 12, which is, in turn, at a similar angle to the lubber-line of the ship, the resistance in the meter circuit is at minimum and the indicator of said meter stands at 0. However, a movement of the arm 13 to either side of the point of connection of the conductor 15 with the resistance 12 will include a part of the latter in the meter circuit and cause said indicator to move over the dial of the meter which has thereon the units from 1 to 10.

The second meter 11, the dial of which is calibrated, for example, with the numerals 10 to 20, each representing a unit which enters into the calculations to be later described, is bridged across a circuit which includes battery, conductor 16, the movable resistance 17 carried by the shaft 6, and from thence through the conductor 18 back to battery. Said resistance is engaged with and movable over the stationary contact bar 19 supported upon the base 7 in parallel relation to and directly over the resistance 12, and is connected to one terminal of the meter 11, the other terminal of which being joined to the conductor 16, thus completing the bridge for the meter. With the resistance 17 at right angles to the bar 19, the indicator of the meter 11 will point to the unit 10 and, as said resistance is moved over the bar in either direction, said indicator will respond to the variations in the resistance in the meter circuit to indicate units on the meter dial from 10 to 20.

Referring now to Figures 2 and 3, it is first pointed out that, with two ships, both of which are under way, it is possible, with the present system, to make two different calculations as to the distance between said ships, one of which calculations will be more accurate than the other. In other words, it may not be necessary, after the direction of a distant ship is ascertained, to obtain more than a rough estimate as to its position, but, on the other hand, if the direction of the distant ship is such that the courses of the vessels may intersect, it would then be desirable to ascertain a closer approximation of the distance therebetween. In making the less accurate calculation, only the meter 10 need be employed to determine one of the required factors for the mathematical equation (later to appear) by which the unknown distance is obtained, while both meters are used when securing a more accurate determination of said distance.

Figure 2 illustrates diagrammatically the manner in which, by triangulation, the less accurate calculation is made and it is in this instance, as previously mentioned, that it is entirely unnecessary for the two ships to communicate with each other. The approximate calculation, presently to be described in connection with Figure 2, is the "beam distance" between the two ships, that is, the distance between two imaginary lines representing the courses of the ships, assuming, for the moment, that they are running parallel to each other. Thus, as viewed in Figure 2, the line $x$ of the right angle triangle, upon which all "beam" calculations are based and the length of which is the unknown factor to be determined, represents the "beam distance" between the two ships which, for purposes of this calculation, are theoretically traveling on parallel courses. In order to ascertain said factor, three other factors involved in the mathematical equation, upon which the solution of the problem is based, must be known. In the particular example being described in which the solution is worked out on the basis of a right angle triangle, one of the known factors is constant and is represented by the line $a$ which is actually the short distance between the axis of the shaft 6 and the point of contact of the arm 13 with the resistance 12 when the two are at right angles to one another. This known constant factor is represented by a definite number of units, for example 10 and the meter is so calibrated and affected by the resistance 12 that the amount of deviation of the arm 13 relative to its right angular position is indicated on said meter in units corresponding to those into which the line $a$ is divided. This amount of deviation is utilized to determine the second factor of the equation which is represented by the line $b$. In so doing, two readings of the meter 10 must be taken at definite periods of time and the desired factor is the difference between said readings. The third factor, represented by the line $c$, is the combined speeds of the two vessels in approaching a point where their courses might intersect. The speed of the distant ship is, of course, unknown in the present example, but, for purposes of this calculation, the speed of each vessel is taken as approximately fifteen knots. Such assumption is, as a matter of fact, common nautical practice when the actual speed of a ship has not been determined and is sufficient for purposes of approximate calculations. Therefore, with a combined speed of thirty knots per hour, the speed traveled by the two vessels during the above-mentioned interval of time can be easily calculated, the result being the third factor required for the mathematical equation by which the "beam distance" between the two ships is determined.

A specific example of the method by which the "beam distance" between two ships may be ascertained will now be described. It will be assumed, as shown in Figure 2, that the navigator on the ship 20 has picked up the radio signal broadcast by the distant ship 21 by means of the antenna 5, which is then rotated until the deadpoint is reached in which the radio receiving set 5' coupled to said antenna no longer responds to said signal. The position of the antenna relative to its axis of rotation is then such as to indicate the direction of the source of the transmitted signal. If it should so happen that the direction is dead ahead, the ship is immediately stopped, or its course changed, until the dead-point of the antenna can be picked up off the port of starboard bow of the vessel. When such a relative position is determined, such as indicated by the line 22, wherein the direction is shown as off the starboard bow of the ship, the navigator immediately records the exact time and the reading on the meter 10, which latter will be assumed to be 6, the indicator of said meter having responded to the movement of the arm 13 over the resistance 12. At the expiration of one minute, or any other definite interval of time, the antenna 5 is turned again until the dead-point is reached, whereupon a second reading taken from the meter 10 will be recorded, which, for example, will be 5, it being understood that the relative positions of the two ships has changed during said interval of time. The difference between the two readings, which is 1, now determines the second factor representing the line $b$, it being recalled that the first factor is the constant 10 for the line $a$. The third factor $c$ is the combined estimated distance traveled by the two ships in the one-minute interval between the two readings of the meter 10, said distance being .5 knot. The mathematical equation for determining the distance $x$ may now be represented by $$a:b::x:c$$
$$10:1::x:.5$$
$$x=5.0$$

So it is seen that the "beam distance" between the two ships is five nautical miles. The navigator being thus informed and knowing, by the positions of the antenna at the time of the two readings were taken that the courses of the two ships were likely to intersect, proceeds accordingly by changing the course of his vessel to avoid the possibility of collision.

When it is desired to secure a closer approximation of the distance between two ships than the "beam" calculation affords, the system of triangulation of Figure 3 is employed and it is necessary that the navigator of ship 20, after picking up the radio signal of ship 21 and noting that its direction is such that the distance away should be calculated, communicate with the latter ship to ascertain its speed and course. Upon being informed that the speed of ship 21 is, for instance, twenty-five knots and that its course is diagonal relative to ship 20, the navigator immediately takes the first reading on the meter 10 and after the lapse of a definite period of time, such as one minute, takes the second reading on said meter in the same manner as previously described. It will be assumed again that the difference between the two readings is 2, thus determining the factor $b1$. Bearing in mind that the factor $a1$ is not constant in the example now being explained, as was the factor $a$ in the "beam" calculation, it is necessary to obtain said factor by a reading on the meter 11, which reading is taken concurrently with the second reading on the meter 10. The factor $a1$ is variable due to the fact that the resistance 17 is movable over the fixed contact bar 19 and, consequently, the actual distance between the shaft 6 and the point of contact of the resistance on said bar varies with the position of said resistance as the shaft 6 is rotated. Thus, assuming that the line $22a$ represents the direction of the distant ship at the time of the first reading and that the direction at the time of the second reading was along the line $a1$, it will be apparent that the actual length of the latter line is greater than that of the line $a$ which was used as constant factor in the first example. The meter 11 is so calibrated and controlled by the resistance 17 that it will indicate the length of the line $a1$ at the time of taking the reading and it will be assumed that the indicator of the meter is pointing to 12. Therefore, it is now known that the first factor is 12 and that the second factor, represented by the line $b1$, is 2. Having been informed that the distant ship 21 is making twenty-five knots and knowing the speed of the ship 20, which, for example, is assumed to be twenty knots, it is obvious that the combined speed is forty-five knots and, therefore, the third factor $c1$ is determined as .75 knot for the interval of one minute between the first and second readings. Therefore, the equation will be $$12:2::x:.75$$
$$2x=9.00$$
$$x=4.5$$

Consequently, the distance represented by the line $x$ of Figure 3 is approximated at 4.5 nautical miles.

Should it become desirable or necessary to establish the distance of the ship 20 relative to a fixed point, such as a shore station 23 (Figure 4) from which a radio signal is being broadcast, substantially the same procedure is followed as in the first example. An initial direction 24 is first determined by the antenna 5 and a reading of the meter 10 taken. Then, after a lapse of a definite period of time, as when the ship has reached the position at the left of said figure, a second reading is taken on said meter. Knowing the constant factor of 10 corresponding to the factor $a$ of the first example, also the factor represented by the difference in the two readings which, for purposes of illustration is assumed to be 1, and further knowing the distance the ship has traveled between the times of taking the two readings, the distance from the ship to the shore station may be ascertained. Assuming that the interval of time was one-half hour and that the speed of the ship was twenty knots, the equation reads $$10:1::x:10$$
$$x=100$$

thus showing that the ship is one hundred nautical miles from the station 23 at the time of the second reading. It is obvious from the foregoing that the same calculation may be made by taking two readings, without the lapse of a definite period of time, from two different shore stations, the distance between which is known to the navigator on the ship.

When a distant object, such as a point on shore, or another ship, is visible to the navigator, the same calculations as heretofore described may be effected by the use of the sighting instrument 9 mounted upon the shaft 6. By training said instrument upon the distant object, the shaft is rotated to cause the meters 10 and 11 to indicate the units on the scales thereof by which the factors $a1$, $b$ and $b1$ are obtained and, then, with the other known factor, namely, the speed of the ship, the distance between the latter and the distant point may be ascertained.

What is claimed is:

1. In a system of the class described, a movable direction-finding device, a rotatable shaft therefor, means to turn said shaft and device, a radial arm attached to said shaft and encircled by a resistance winding, a horizontal conductor bar contacting with said resistance winding and spaced sufficiently from said shaft so that the distance of its contact from said shaft will vary upon movement of said direction-finding device, an electrical circuit connected to said arm and bar, and a meter in said electrical circuit and operated to indicate a reading by a movement of said direction-finding device and consequent rotation of said shaft.

2. In a system of the class described, a movable direction-finding device, a rotatable shaft therefor, means to turn said shaft and device, a radial arm attached to said shaft and encircled by a resistance winding, a horizontal conductor bar contacting with said resistance winding and spaced sufficiently from said shaft so that the distance of its contact from said shaft will vary upon movement of said direction-finding device, another radial arm projecting from said shaft in spaced relation to the first-named radial arm and parallel thereto, another horizontal bar spaced from and parallel to the first-mentioned bar, said other horizontal bar being provided with a resistance winding contacted by the second-named radial arm at a plurality of points depending upon the rotation of said shaft, electrical circuits one of which includes the first-mentioned arm and bar and the other the second-mentioned arm and bar, and a meter in each of said circuits operated by movements of said direction-finding device.

3. In a system of the class described for a vessel, a movable direction-finding device; a shaft connected to said device; resistance elements normally at right angles to each other; a plurality of radial arms extending radially from said shaft individual to each of said resistances, and arranged to vary said resistances individually; circuit connections including said resistances; and indicating devices connected in each of said circuit connections for indicating the angular position of the associated arms, said radial arm resistances and circuit connections being such that the two indications provide a basis for determining the course of the vessel.

4. In a system of the class described; a movable direction-finding device; a shaft connected to said device and rotated thereby; a plurality of radial arms extending from said shaft, one of said arms carrying a resistance element; a transverse arm, individual to and engaged by said resistance-carrying arm; a second transverse arm individual to and engaged by the other of said arms, said second arms carrying a resistance engaged by the corresponding arm; electrical circuit connections individual to each arm and its associated transverse member; and indicators connected in each of said circuits for indicating the angular position of the associated arm.

5. In a system of the class described for vessels; a movable direction-finding device; a rotatable shaft therefor; means for turning said device and shaft; a resistance element; an indicator; a source of energy; an electrical circuit including said resistance, indicator and source of energy; means controlled by the rotation of said shaft for varying the amount of resistance in said circuit whereby the angular position of said shaft is indicated; a second resistance element normally at right angles to said first resistance; a second indicator; a second source of energy; a second electrical circuit including said resistance, indicator and source of energy; and means whereby a variable amount of said second resistor is connected in said second circuit in accordance with the angular rotation of said shaft, said first and second indications providing indications for determining the course and position of the vessel.

6. In a system of the class described; a movable directional antenna for vessels; a shaft connected thereto and rotatable therewith; a first arm and a second arm connected to said antenna and rotatable therewith; circuit connections to each of said arms including a resistance and indicator means whereby as said shaft is rotated, one of said resistances is decreased in value while the other is increased and vice versa for variably operating said indicators, said indicators providing indication which jointly indicates the course and position of the vessel.

7. In a system of the class described; a movable directional indicator; a shaft connected thereto and rotatable therewith; a pair of radial resistance arms extending from said shaft; and a means whereby as the shaft rotates, the resistance value of one of said resistances is increased and the resistance value of the other of said resistances is simultaneously decreased for operating their respective indicators.

FERDINAND EICKE.